June 29, 1954     G. G. LARSEN     2,682,118
EDUCATIONAL DEVICE
Filed May 24, 1952

GERALD G. LARSEN,
INVENTOR.

BY

ATTORNEY.

Patented June 29, 1954

2,682,118

UNITED STATES PATENT OFFICE 2,682,118

EDUCATIONAL DEVICE

Gerald G. Larsen, San Bernardino, Calif.

Application May 24, 1952, Serial No. 289,802

4 Claims. (Cl. 35—35)

This invention relates generally to an educational device and particularly describes a set of lettering elements and associated printed matter by which alphabetical and numerical characters may be formed by young children.

It is well known that the process of learning to write is a tedious and lengthy one for children. The learning process can be expedited and made more effective by making it interesting and challenging, and it is especially desirable to provide means with which the child can do his experimentations with only intermittent rather than continuous supervision by an adult.

The present invention includes a set of lettering elements consisting of four different basic shapes. For greater realism in practicing the invention I may also provide a fifth element to be used in conjunction with the basic four, although this last is not absolutely necessary for satisfactory use of the device, as will be seen hereinafter. The elements may be made of cardboard, thin metal, plastic or other suitable flat material. By proper arrangement of selected elements the user can form any printed letter of the alphabet, both capital and small, and any Arabic numeral. Preferably all elements of each of the different shapes have the same color, so that an element may be identified to a child by its color.

In a preferred form of the invention a sheet of paper is provided bearing the picture of a well known object such as an animal or bird. The name of the object may be printed on the sheet immediately below the picture in letters corresponding to those formed by the lettering elements. Below the printed name the sheet may include a space in which the child may arrange the movable lettering elements to duplicate the printed letters and thus to spell the word.

Children in the approximate age range of from four to seven enjoy making letters and words by means of the present invention. It proves useful when a child just learning to write in school tends to lag slightly behind the pace of his class, since the lettering elements and associated printed pictures and words can be made at very low cost and can therefore be provided at home for additional training. Often a child learning to write and spell is impeded not so much by failure to understand and remember what to do as by lack of digital dexterity in holding and manipulating a pencil. This dexterity eventually comes, of course, but meanwhile the child can practice the formation of letters and words by using the lettering elements herein disclosed. Only a small degree of dexterity is needed, and hence by the present invention children may be introduced to the formation of letters and words at an appreciably earlier age than has been customary heretofore.

It is therefore an object of this invention to provide a novel set of lettering elements for educational purposes.

Another object is to disclose lettering elements and associated pictures and words to encourage children to learn to form letters and to spell words.

A further object is to provide a set of lettering elements wherein different forms of a set are distinguished by color.

A still further object is to provide a set of lettering elements having open interiors whereby desired shapes may be copied onto an underlying surface by using the elements in the manner of stencils.

Another object is to provide an educational device having the above characteristics which is extremely economical to manufacture.

These and other objects, purposes and advantages of the invention will be clear from a reading of the following description of preferred embodiments thereof taken in connection with the accompanying drawing in which.

Figure 1:
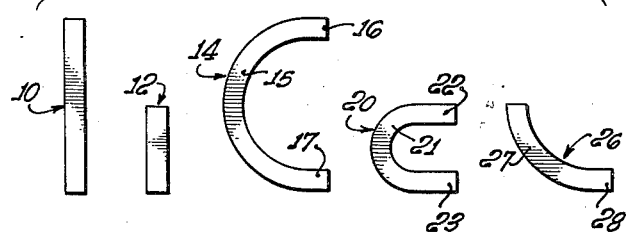
Fig. 1 shows five basic lettering elements of my invention.

The lettering elements shown in Fig. 1 include a large rectangular element 10, a small rectangular element 12, a large curvilinear element 14 and a small curvilinear element 20. A fifth element 26 may also be provided, and assumes the shape of one half of large curvilinear element 14. As previously mentioned the elements are made of a material such as cardboard, light metal or a suitable synthetic thermo-setting or thermo-plastic substance which is hard and durable in its finished state. The material should be thick enough to be easily grasped and maneuvered by children's fingers; a thickness of the order of ⅛" is very satisfactory.

The rectangular elements 10 and 12 are preferably made of equal width, and the length of the small rectangular element 12 is preferably made to be half that of the large rectangular element 10. Large curvilinear element 14 includes a semi-annular portion 15 and may also be provided with a relatively short leg 16 and 17 at either end of semi-annular portion 15. Legs 16 and 17 are parallel, and may be formed integrally with the semi-annular portion 15 and disposed tangentially relative thereto. Small curvilinear element 20 includes a semi-annular portion 21 and a pair of integrally formed, tangentially extending legs 22 and 23 at the upper and lower ends respectively of semi-annular portion 21. Legs 22 and 23 are parallel and may desirably be of a length equal to the outer radius of curvilinear portion 21.

The outer diameter of large curvilinear element 14 is made to be equal to the length of large rectangular element 10. Similarly, the outer diameter of small curvilinear element 20 is equal to the length of small rectangular element 12. Since the small rectangular element 12 is half the length of large rectangular element 10, it will be seen that the outer diameter of small curvilinear element 20 is half that of large curvilinear element 14. The annular width of the curvilinear elements 14 and 20, as well as the width of legs 16, 17, 22 and 23, is equal to the width of the rectangular elements 10 and 12.

Curvilinear element 26 which as above stated is desirably provided for use in conjunction with elements 10, 12, 14 and 20, assumes a shape of one-half that of large curvilinear element 14. Element 26 includes a curvilinear portion 27 which extends arcuately only 90° instead of the semi-circular extent of 180° characteristic of large curvilinear element 14, and at one end of curvilinear portion 27 may include an integrally extending leg 28. The annular width of portion 27 and the width of leg 28 are made to be equal to the uniform width preferably maintained throughout the other elements previously described. The length of leg 28 is desirably equal to that of each of legs 16 and 17.

As illustrative of suitable dimensions for the several elements, it is noted that large rectangular element 10 may be two inches in length by ¼ inch in width, and small rectangular element 12 may be one inch long and ¼ inch in width. The large curvilinear element 14 will then have an outer diameter of two inches (equal to the length of element 10) and an inner diameter of one and one-half inches, thus providing a width of ¼ inch in the semi-annular portion. Legs 16 and 17 in such a structure may be approximately ¼ inch in length. Small curvilinear element 20 should then have outer and inner diameters of one inch and ½ inch respectively, and legs 22 and 23 will each be approximately ½ inch long. Curvilinear element 26 should have outer and inner diameters of two inches and one and one-half inches respectively, and leg 28 should be ¼ inch long.

It will of course be readily understood that the suggested dimensions given above do not represent the only sizes of the several lettering elements in accordance with my invention. Both the absolute dimensions and the relationships between dimensions of the several elements may differ appreciably from the values and proportions herein suggested and still yield satisfactory results in use.

Figure 2:
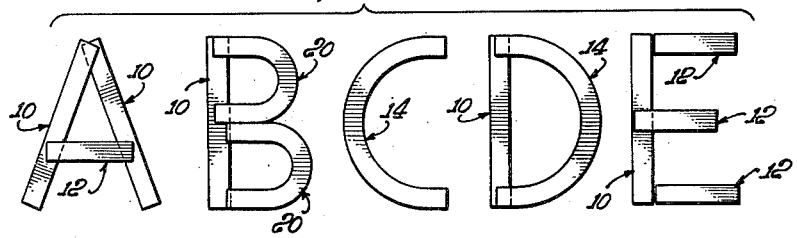
Fig. 2 illustrates the arrangement of elements for forming certain printed capital letters.
Figure 3:
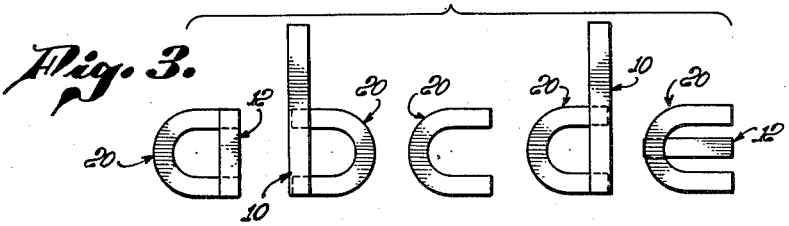
Fig. 3 illustrates the arrangement of elements for forming certain printed small, or lower case, letters.

The capital or upper case printed letters of Fig. 2 and the small or lower case printed letters of Fig. 3 illustrate the use of the elements of my invention in the formation of letters, with the elements indicated by the same reference characters as those heretofore used.

Figure 4:
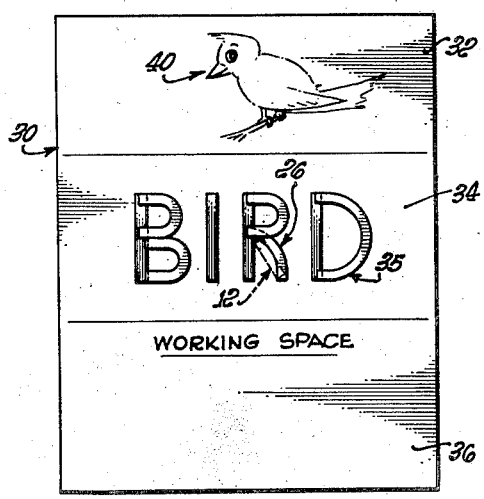
Fig. 4 is a plan view of a sheet of paper or card including a picture of an object and its name, which may be used in practicing the invention.

A printed card or paper illustrative of the practice of my invention is indicated generally at 30 in Fig. 4. Card 30 may be divided into three general areas: a picture space 32, a word space 34 and a blank area or working space 36. Within picture space 32 there is depicted a common object such as a bird indicated generally at 40. In word space 34 there is printed the name 35 of the object, the letters of the name being formed with the lettering elements previously described. Each of the different forms of the lettering elements 10, 12, 14 and 20 (and 26 when used) bears a distinctive color. For example large rectangular element 10 may be colored black, small rectangular element 12 may be blue, large curvilinear element 14 may be red, small curvilinear element 20 may be orange, and curvilinear element 26 may be green. The word or name 35 is printed in the colors of the lettering elements. Thus the child seeing the object 40 and the name 35 printed in colors corresponding to the colors of his lettering elements can quickly see how the several elements should be assembled to form each of the letters. This he does in the working space 36. After suitable proficiency in this work has been attained, the teacher, parent or other adult who is helping the child may increase the difficulty of the work by covering the word space 34 with an opaque member such as a sheet of paper or the like. The child must then not only form the letters from memory but also must remember the correct spelling of the concealed word.

Working space 36 on paper or card 30 may advantageously be provided with a slightly roughened surface so that a lettering element once placed in desired position in the space 36 will tend to remain where placed while other lettering elements are being arranged. A thin layer of cloth fixed to working space 36 as by suitable adhesive or the like serves this purpose very well.

It is to be noted that the capital letter "R" is shown in full lines in Fig. 4, as including lettering element 26 in its formation. As previously pointed out, element 26 is not necessarily used in the present invention, and the small rectangular element 12 may be used with satisfactory results, as indicated in dotted outline in Fig. 4.

Figure 5:
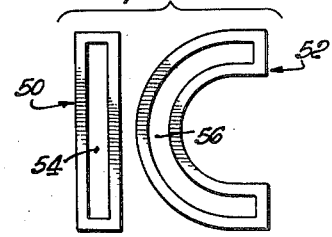
Fig. 5 shows, for two of the lettering elements, stencils having open interiors which may be used in practicing the invention.

When the lettering elements of this invention are formed by a punching or similar operation from sheet material, e. g. cardboard, metal strip or the like, the material from which the elements are punched may serve as stencils for a somewhat different type of training in letter formation and spelling. In Fig. 5 are shown two such stencils 50 and 52, being those resulting from punching out large rectangular element 10 and large curvilinear element 14 respectively from sheet material. The interior portions 54 and 56 respectively are of course open, so that the child may, by using suitably colored crayons, form counterparts of the lettering elements on a sheet of paper on which the stencils are placed. The stencils proper are desirably colored the same as the corresponding elements. Thus the child, as soon as he has sufficient dexterity to handle a crayon, is encouraged to form letters by actually writing them with the aid of the stencils, used in conjunction with the pictures and words on cards 30.

Accordingly it will be seen that I have provided a novel and extremely useful educational device for encouraging children to learn to form letters and words even before their dexterity permits effective use of conventional pencils. By the use of colors which are easily recognizable by a child of four or so, the child can derive enjoyment as well as instructional benefit from learning how letters are formed. Since there are only four different shapes of elements (or five if curvilinear element 26 is used), the child is not confused by a large number of different letters, as in the case of conventional blocks and the like bearing letters thereon.

It will be understood that a set of lettering elements as used herein includes a plurality of each of the four (or five) lettering elements so that a number of letters may be made up at one time. Also it is to be noted that the proportions among the various dimensions of the several elements need not be precisely as stated herein in order to form satisfactorily recognizable letters and numerals. Changes and modifications from the specific forms and shapes herein shown and described may be made without departing from the spirit of the invention.

I claim:

1. An educational device comprising: a flat member having a substantially planar surface and bearing in its upper portion a picture of a selected object; and a set of lettering elements including a first rectangular element, a second rectangular element half as long as the first rectangular element, a first curvilinear element having a semi-annular portion with an outer diameter equal to the length of the first rectangular element, a second curvilinear element having a semi-annular portion with an outer diameter equal to the length of the second rectangular element, and a third curvilinear element having an arcuate annular portion extending substantially 90° of arc and outer diameter substantially equal to that of the first curvilinear element, the widths of the rectangular elements and the annular widths of the curvilinear elements being equal, the said planar surface being imprinted with the name of the selected object beneath the picture of the object, the letters forming the name being made up of component portions corresponding in shape to said elements.

2. An educational device as stated in claim 1, wherein each of the five elements is distinctively colored, and the component portions of the letters of said imprinted name are correspondingly colored.

3. A set of thin, flat lettering stencils comprising: a first element provided with an elongated rectangular opening therein, a second element provided with a semi-annular opening therein having an outer diameter substantially equal to the length of said rectangular opening; a third element provided with a rectangular opening having a length substantially half that of the first named rectangular opening; and a fourth element provided with a semi-annular opening therein having an outer diameter substantially equal to the length of the second named rectangular opening, and provided with a pair of outwardly extending parallel rectangular openings merging with said second semi-annular opening and tangent thereto, the width of said rectangular openings and the annular width of said semi-annular openings being equal.

4. A set of stencils as stated in claim 3, including a fifth element provided with an annular arcuate opening extending substantially 90° of arc and having outer and inner diameters substantially equal to the respective outer and inner diameters of the semi-annular opening in said second element, and wherein each of said five elements is distinctively colored.

References Cited in the file of this patent

UNITED STATES PATENTS

| Number | Name | Date |
|---|---|---|
| 364,845 | Oakley | June 14, 1887 |
| 793,376 | Jahn | June 27, 1905 |
| 1,493,485 | Faust | May 13, 1924 |
| 2,277,329 | Kimbrough | Mar. 24, 1942 |
| 2,454,632 | Cohn | Nov. 23, 1948 |

FOREIGN PATENTS

| Number | Country | Date |
|---|---|---|
| 2,029 | Great Britain | Feb. 5, 1889 |
| 21,958 | Switzerland | July 24, 1900 |
| 30,100 | Great Britain | Dec. 31, 1912 |
| 102,055 | Switzerland | Nov. 1, 1923 |
| 157,563 | Great Britain | Jan. 24, 1921 |
| 248,950 | Great Britain | Mar. 18, 1926 |
| 494,981 | France | June 13, 1919 |